INVENTOR.
ROBERT N. BOYD
BY
ATTORNEYS

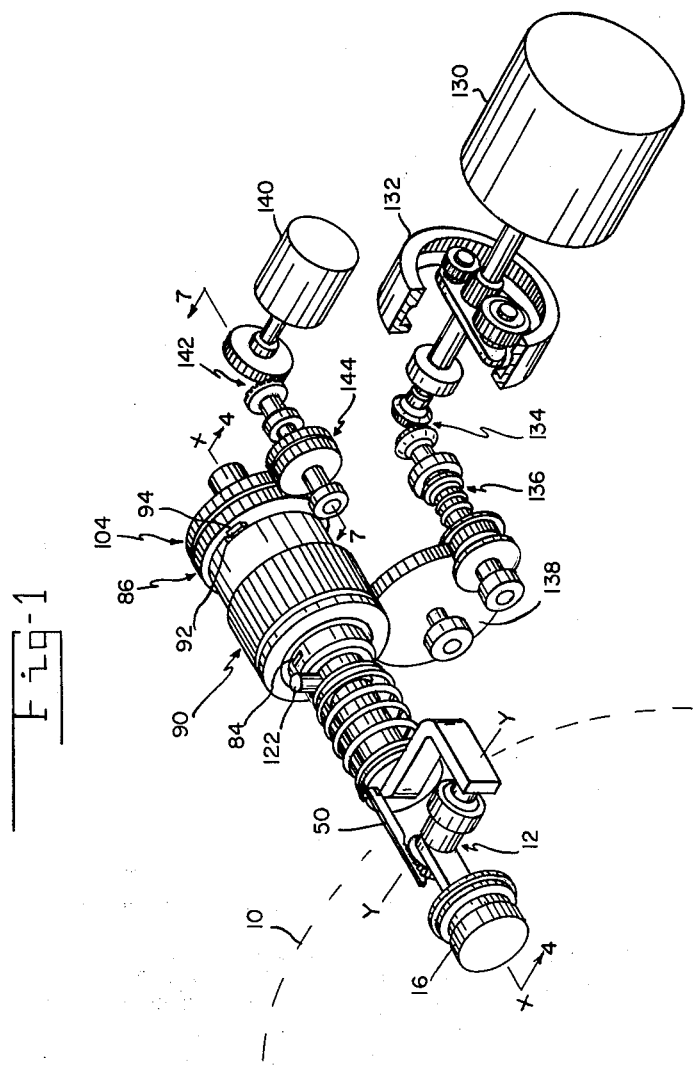

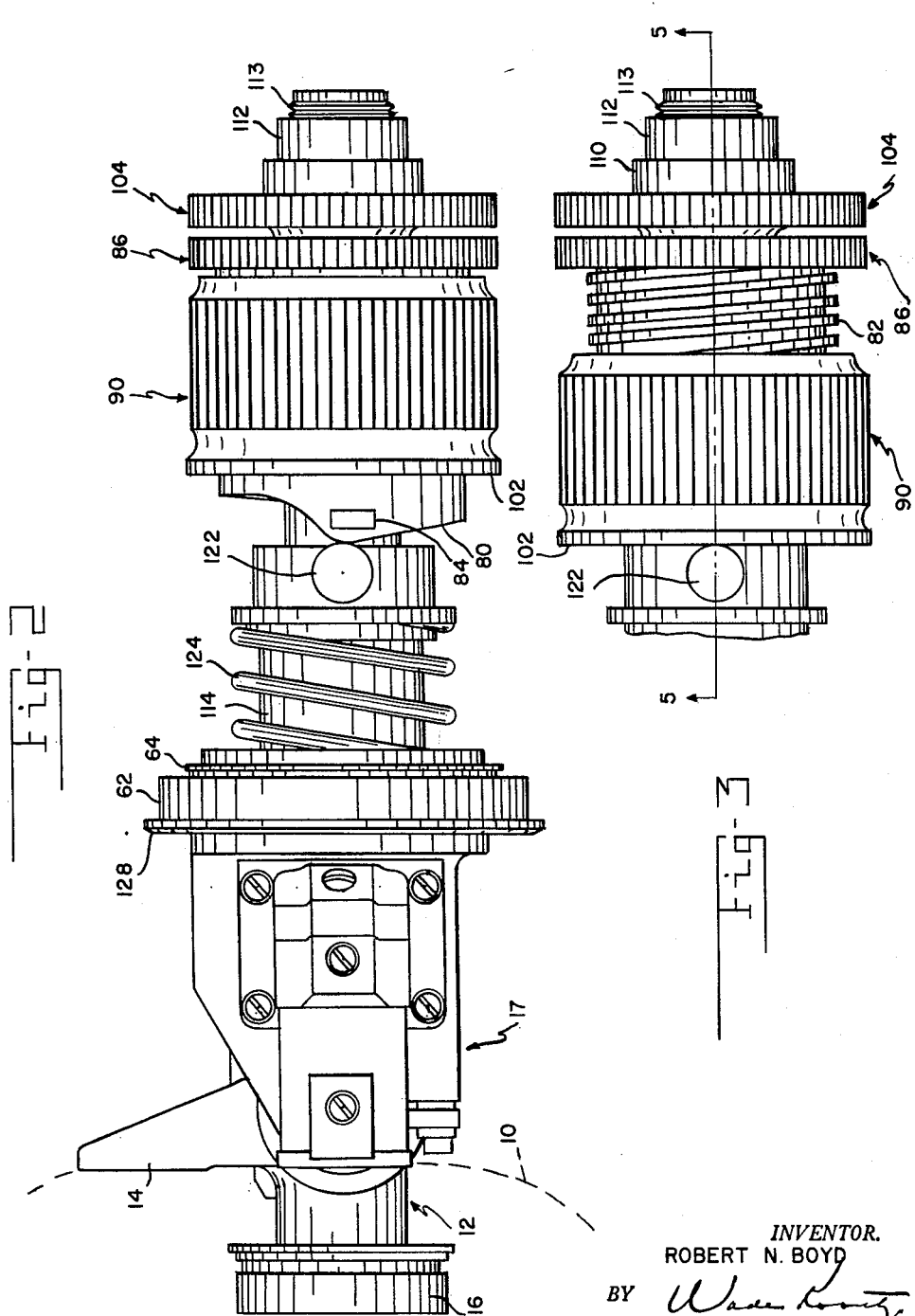

Dec. 22, 1964  R. N. BOYD  3,162,056
SCAN AND TRACK NUTATION DEVICE
Filed Jan. 3, 1962  5 Sheets-Sheet 4
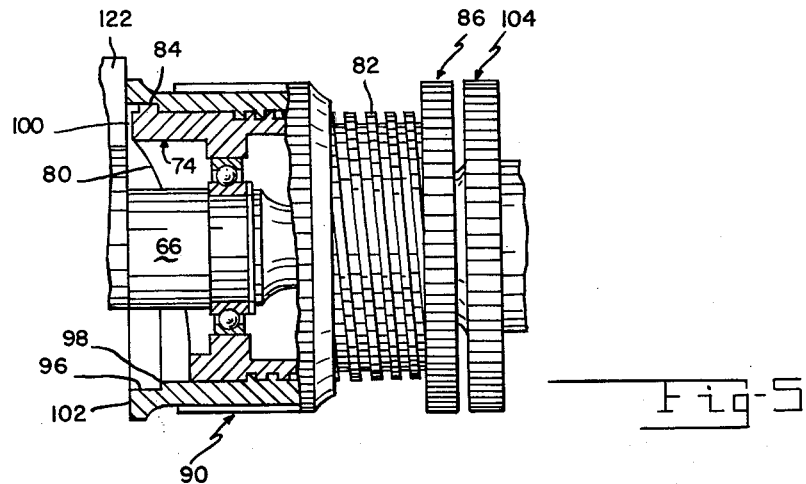
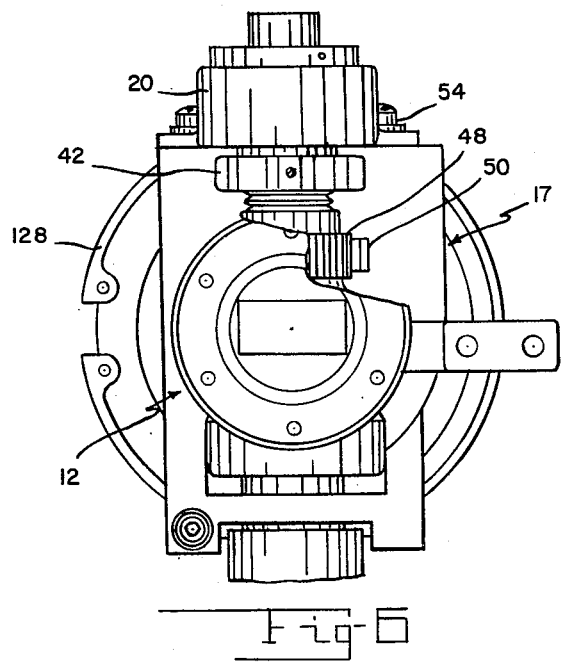
INVENTOR.
ROBERT N. BOYD
BY
ATTORNEYS

United States Patent Office 3,162,056
Patented Dec. 22, 1964

3,162,056
SCAN AND TRACK NUTATION DEVICE
Robert N. Boyd, San Carlos, Calif., assignor to the United States of America as represented by the Secretary of the Air Force
Filed Jan. 3, 1962, Ser. No. 164,202
4 Claims. (Cl. 74—86)

This invention relates to radar scanning devices and more particularly to those devices which selectively shift from spiral scanning to conical tracking.

Radar devices, such as those carried on board aircraft which is used to search out and destroy enemy aerial targets, must be capable of scanning or searching over a large area for targets while the aircraft is flying on course. Then having found a target within the scanned field of search, the radar is operated in a manner to direct the aircraft in the direction of the target until the target is within effective range of the aircraft's armament.

Radar antennae, such as used on aircraft, consist essentially of a pivoting spindle which supports a forwardly protruding wave guide which emits electronic rays forming a radar beam which is directed forward by means of a parabolic reflector which is attached to and revolves with the spindle assembly. Returning beams from a reflecting object or target impinge on the reflector and through proper circuitry are transformed into a picture on an oscilliscope tube.

The pivoting spindle which supports the wave guide and reflector is revolved at a high rate of speed by a drive mechanism. In operation, while the spindle assembly is being rotated, it is also caused to have a variable angular deflection in azimuth about its pivot axis. This variable angular deflection is commonly known as "nod" or "nutation." It is thus seen that when the spindle assembly is rotated while pivoted at a fixed angular displacement with the axis of the drive mechanism, a cone will be generated by the radar beam. Also, that when the angular displacement or nod angle is under continual variance, so too the generated cone is under continual variance. It is obvious that the apex angle of the generated cone is twice the angular displacement of the spindle assembly. It is thus seen that when the nod angle is varied between 0° and 45°, the area searched or scanned will vary from 0° to 90° in a spiral pattern.

Once a target has been discovered within the area being scanned and it is desired to close in on the target, it becomes necessary to shift the radar antenna from large area spiral scanning to small fixed angle conical tracking. This is accomplished by displacing the spindle at a fixed angle of say 2.8° which will generate a cone with apex angle of 5.6°. The aircraft may close in on the target by flying down the axis of the generated cone since the drive mechanism of the radar and the aircraft have parallel longitudinal axes.

One object of this invention is to provide a simple and rugged mechanism for rapidly shifting from spiral scanning to conical tracking.

Another object of this invention is to provide for approximately equal energy distribution over the spirally scanned area by decreasing the rate of angular change as the nod angle increases.

Still another object of this invention is to provide a means for varying the nods per minute, independent of the spindle's r.p.m.

Additional objects, advantages and features of the invention reside in the construction, arrangement and combination of parts involved in the embodiment of the invention as will appear from the following description and accompanying drawings, wherein:

FIG. 1 is a schematic representation of an embodiment of the present invention with driving means;

FIG. 2 is a bottom horizontal view of the device in scanning operation and showing the cam follower riding on the cam;

FIG. 3 is a partial bottom view of the device in tracking operation and showing the drive gear overriding the cam;

FIG. 5 is a partial section along line 5—5 of FIG. 3 showing the drive gear in tracking operation;

Figure 4:
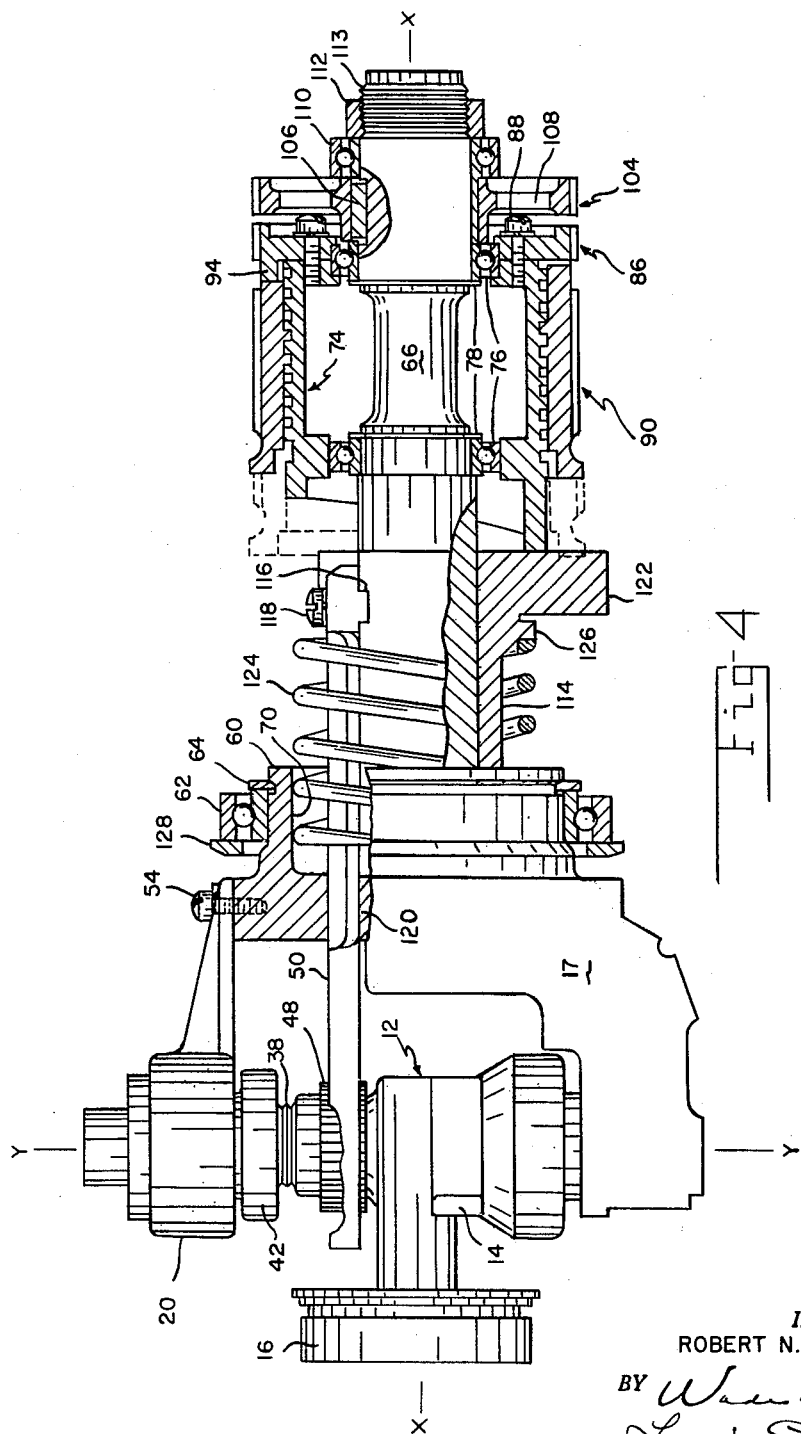
FIG. 4 is a horizontal section along line 4—4 of FIG. 1 showing the device in scanning operation, and in phantom showing the axial position of the drive gear in tracking operation.
Figure 7:
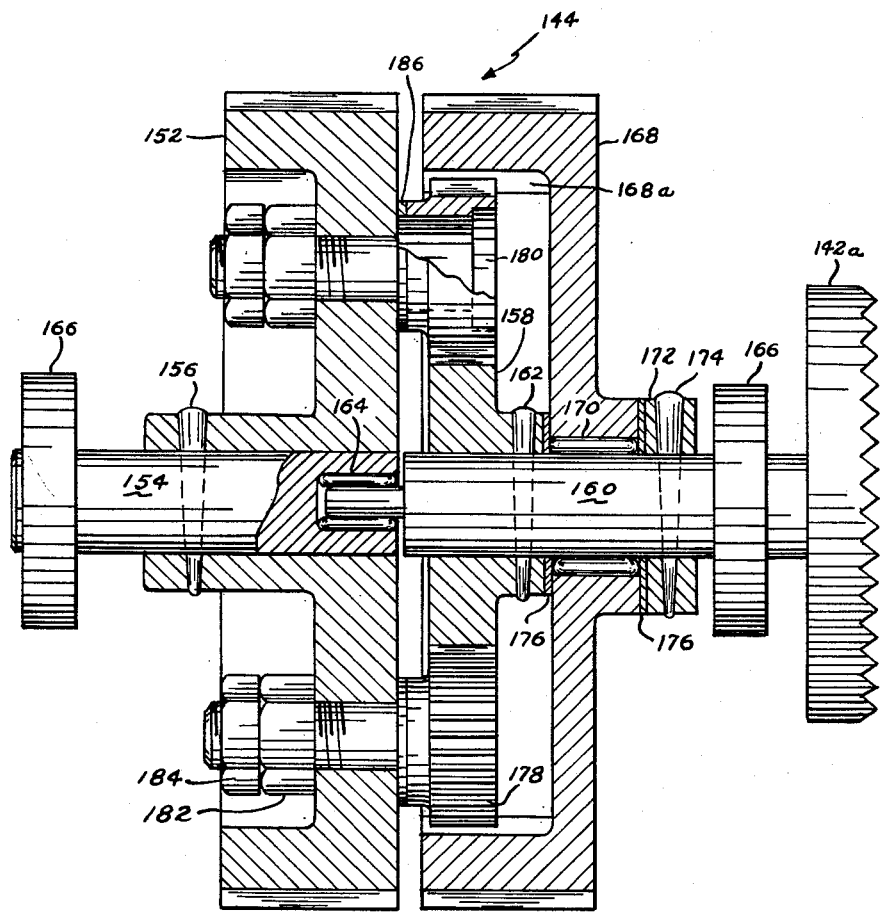

FIG. 6 is an incomplete end view of the spindle end of FIG. 4 rotated 90° clockwise; and FIG. 7 is an enlarged cross section taken on line 7—7 of FIG. 1 showing the construction of differential 144.

Referring to FIG. 1 and FIG. 4 the device is shown without electronic components which form no part of this invention. A parabolic reflector 10 (shown in phantom) is joined to and moves with nod spindle 12 by attachment to mounting bracket 14 which is an integral part of nod spindle 12. Electronic sending gear, which is not shown, is attached to the protruding disc 16 which is also an integral part of nod spindle 12 and at right angle to the nod axis. The parabolic reflector 10 and the electronic gear attached to protruding disc 16 rotate with spindle 12 about axis $x$—$x$ and nod or oscillate with spindle 12 about axis $y$—$y$ which is transverse to axis $x$—$x$. The electronic gear attached to protruding disc 16 and the parabolic reflector 10 cooperate in sending and receiving beams necessary to operate the radar system.

Nod spindle 12 is trunnioned or pivoted to nod or oscillate about axis $y$—$y$ within body 17 and end bracket 20. The spindle may be supported by anti-friction bearings which are not shown. The axial clearance of the spindle on axis $y$—$y$ may be adjusted in a manner well known to the art by means of adjusting nut 42 which engages thread 38 on the spindle.

Integral with or joined to nod spindle 12 in any manner well known to the art is pinion gear 48 which engages rack 50 in a manner and for a purpose hereinafter described. End bracket 20 is joined to body 17 by means of screws 54.

Body 17 has a hub 60 which is externally machined to be journaled within bearing 62 which is retained onto hub 60 by snap ring 64. Shaft 66 may be joined to body 17 in any manner well known to the art; as for example, having a flange on the end of shaft 66 which slidably engages bore 70 of body 17 where it is joined to the bottom of bore 70 by means of a plurality of screws parallel to axis $x$—$x$.

Circular cam 74 is rotatably supported on shaft 66 by means of two bearings 76 held in place by snap rings 78. Circular cam 74 has an irregularly shaped cam surface 80 as best shown on FIG. 2 and FIG. 5 whose purpose will be explained hereinafter. On the periphery of circular cam 74 is a right hand helical spline 82 as best shown on FIG. 3 and FIG. 5 whose purpose will be explained hereinafter. Also on the periphery of circular cam 74 is a lug 84 as best shown on FIG. 1, FIG. 2 and FIG. 5 whose purpose will be explained hereinafter.

A differential input gear 86 is rotatably supported by one bearing 76 and is joined to the circular cam 74 by a plurality of screws 88. It is noted that circular cam 74 and the differential imput gear 86 are joined together to act as a unit rotatable on shaft 66.

Drive gear 90 is machined with a right hand internal helical spline which cooperates with the external helical spine 82 on circular cam 74. At the end of drive gear 90 which is nearest differential input gear 86, a step 92 is machined. Referring to FIG. 1 and viewing the device from the nod spindle 12 end, when drive gear 90 is driven clockwise, the drive gear moves axially along axis $x$—$x$ to the rear on the helical spline until step 92 engages a driving lug 94 on the face of differential input gear 86. Under this condition drive gear 90 is driving differential input gear 86 which in turn is driving circular cam 74; both gears and the cam rotating at the same speed around shaft 66.

The opposite end of drive gear 90 has a counterbore 96 of sufficient diameter to pass over lug 84 on circular cam 74 when the drive gear is driven counterclockwise as shown on FIG. 5. The bottom of counterbore 96 has a shoulder 98 which engages the back side of lug 84 as also shown on FIG. 5. The depth of counterbore 96 is such as will provide a determined amount of displacement or override 100 between the face or zero rise cam 102 on drive gear 90 and the high point of cam surface 80 on circular cam 74 for a purpose as hereinafter described.

Differential output gear 104 is keyed to rotate with shaft 66 by key 106. A plurality of holes 108 are in the web of gear 104 to provide access to screws 88. The differential output gear 104 is of the same pitch diameter and has the same number of teeth as differential input gear 86. The tail end of shaft 66 is journaled in bearing 110 which is held in place by lock nut 112 which engages thread 113 on the shaft.

Coaxial with and axially movable on shaft 66 is sleeve 114. The tail end of rack 50 has a key 116 which engages a key slot on sleeve 114 where it is held in place by screw 118. Rack 50 passes through a guide hole 120 in body 17. The guide hole serves the dual purpose of holding rack 50 in engagement with pinion gear 48 and also prevents sleeve 114 from rotating relative to body 17. Integral with sleeve 114 is cam follower 122 which rides on cam surface 80 of circular cam 74. Compression spring 124, nesting within the circular bore 70 of hub 60 and bearing against spring saddle 126 integral with sleeve 114, is biased to maintain engagement between cam surface 80 and cam follower 122. If desired, antifriction devices may be incorporated between sleeve 114 and shaft 66 to reduce axial friction. Such devices are not a necessary element, are not disclosed on the drawings and are not claimed as constituting a portion of this invention.

The device as shown on FIG. 4 is mounted in a suitable housing not shown, being supported by bearing 62 and bearing 110. The device is held in place within the housing by means of snap ring 128 in a manner well known to the art.

Referring to FIG. 1 the device is driven by reversible electric motor 130 driving through planetary reduction gear 132, bevel gears 134, spring loaded slip clutch 136 and intermediate gear 138 which engages drive gear 90. Control is provided by electric motor 140 driving through bevel gears 142 and differential 144 which engages differential input gear 86 and differential output gear 104.

Referring to FIG. 7, the differential 144 has two equal diameter gears coaxially supported in side-by-side relationship on independent shafts. In common with other mechanical differential devices, the present differential 144 is a three-element device in which, if two elements are inputs, the third element will be an output. Furthermore, the output in sense and in magnitude will be a composite of the inputs.

Differential 144 has first spur input gear 152 joined to shaft 154 by a taper pin 156. The second input gear is a spur sun gear 158 joined to shaft 160 by a taper pin 162. The outer end of shaft 160 terminates in bevel gear 142a and the inner end terminates in a reduced diameter journaled in needle bearing 164 supported in the inner end of shaft 154 in a conventional manner. The entire differential assembly is journaled in antifriction bearings 166 which are supported in a sealed housing (not shown). The first spur input gear 152 is driven by differential input gear 86 as shown on FIG. 1, and the second input sun gear 158 is driven by motor 140 through bevel gears 142 as also shown on FIG. 1.

Spur differential output gear 168, which in addition to the usual gear teeth on its periphery, has internal gear teeth 168a and is supported on needle bearing 170 for rotation independent of shaft 160. The spur differential output gear 168 is axially retained in position by means of collar 172 joined to shaft 160 by taper pin 174. Hardened wear washers 176 may be placed on each side of gear 168 to reduce friction and wear between elements having relative rotation with each other.

A plurality of pinion gears 178 are rotatably supported on studs 180 so as to be in geared engagement with both sun gear 158 and the internal gear teeth 168a on the spur differential output gear 168. Studs 180 are joined to the spur input gear 152 where they are retained in place by means of nuts 182 and jam nuts 184. A hardened wear washer 186 is placed between each pinion gear 178 and the adjacent part of gear 152.

Differential 144 operates in the conventional manner with gears 152 and 158 providing the inputs and gear 168 being the composite output.

In scan operation, the drive gear 90 is in the position shown on FIG. 1 and is being driven in a clockwise direction when faced from the nod spindle 12 end. The step 92 of drive gear 90 is in engagement with lug 94 on differential input gear 86 with the result that gear 86 is being driven in the same direction and at this same r.p.m. as drive gear 90, as for example 570 r.p.m. The circular cam 74 being joined to gear 86 is also rotating clockwise at 570 r.p.m.

Again referring to FIG. 1, the differential input gear 86 drives differential 144 where enough correction is applied by electric motor 140 to reduce the speed of differential output gear 104 to say 550 r.p.m. clockwise. Referring to FIG. 4, since gear 104 is keyed to shaft 66 which rotates the nod spindle, the spindle with attached parabolic reflector is rotating clockwise at 550 r.p.m. Since the circular cam 74 is rotating clockwise at 570 r.p.m., there is a relative speed of 20 r.p.m. between the cam and the cam follower which rotates at the same r.p.m. as shaft 66. This differential of 20 r.p.m. produces 20 nods or oscillations per minute of the spindle on axis $y$—$y$. The cam follower, being held in engagement with the cam by the compression spring, will impart axial motion to the sleeve 114 along axis $x$—$x$ comparable to the rise and fall of the rotating cam. By means of attached rack 50 which engages pinion gear 48 on the nod spindle, the axial motion of the sleeve is translated into oscillating movement of the spindle about axis $y$—$y$.

Referring to FIG. 2, the cam surface 80 is programmed to provide equal beam energy distribution over the entire scanned area. Since the spindle r.p.m. remains constant, it is noted that the circular velocity over the scanned area is greatest when the nod angle is greatest and that the circular velocity decreases as the nod angle decreases. Equal energy distribution is secured by designing the cam to provide a variable rate of change in the oscillating spindle, the rate of change being at its minimum when the nod angle is at its maximum. It is also noted that the nod angle of the spindle is at its minimum when the cam follower is on the high point of the cam as shown on FIG. 2 and that the cam has a relatively steep "quick return" to place the nod angle at maximum angular displacement from axis $x$—$x$.

The device is shifted from scan to track operation by reversing motor 130 which will produce counterclockwise rotation of drive gear 90. Drive gear 90 moves to the left as shown on FIG. 3, FIG. 5 and by the phantom lines on FIG. 4. As best shown on FIG. 5, shoulder 98 of counterbore 96 engages lug 84 on circular cam 74 and causes the circular cam to rotate counterclockwise with the drive gear. This in turn reverses the drive input into differential 144 and reverses the rotation of shaft 66 from clockwise to counterclockwise. During track operation the relative position of the drive gear 90 and circular cam 74 are shown on FIG. 5. It is noted on FIG. 5 that the face or zero rise cam 102 on drive gear 90 has moved cam follower 122 more than the high point of cam surface 80 by an amount of the override 100. As previously noted, the nod angle of the spindle is at its minimum when the cam follower is at the high point of the cam. During track operation as shown on FIG. 5 the zero rise cam 102 on drive gear 90 overrides the circular surface 80 on circular cam 74 and displaces the nod spindle by a fixed angular amount on the opposite side of axis x—x from which the spindle was variably displaced during scan operation. This fixed angular displacement may be 2.8 degrees for example which would result in a tracking cone of 5.6 degrees.

It is to be understood that the embodiment of the present invention as shown and described is to be regarded as illustrative only and that the invention is susceptible to variations, modifications and changes within the scope of the appended claims.

I claim:

1. A device for selectively providing scanning and tracking motion on a radar apparatus comprising: a nod spindle, means for rotating said nod spindle about a first axis, and rotating means being journaled in bearings adapted to be supported by a housing, said nod spindle being trunnioned to said rotating means on a second axis transverse to said first axis, a pinion gear coaxial with said second axis and joined to said nod spindle, radar antenna support means on said spindle at right angle to said second axis, means for oscillating said nod spindle in a first direction about said second axis, a circular cam for controlling said oscillating means, means for varying the rate of oscillations in relation to spindle rotation; said varying means comprising a differential input gear joined to said cam, a differential output gear joined to said means for rotating said nod spindle, a differential, and differential control means; said oscillating means comprising an axially movable sleeve co-axial with said rotating means, a cam follower joined to said sleeve and engaging said circular cam, a spring biased for holding said cam follower in engagement with said circular cam, and a rack joined to said sleeve and engaging said pinion joined to said nod spindle; said circular cam being programmed for a variable angular rate of change per oscillation, means for overriding said circular cam and displacing said nod spindle to a fixed angle in a second direction about said second axis, and means for driving said rotating means in either clockwise or counterclockwise direction.

2. A device for selectively providing scanning and tracking motion on a radar apparatus comprising: a nod spindle, means for rotating said nod spindle about a first axis, said rotating means being journaled in bearings adapted to be supported by a housing, said nod spindle being trunnioned to said rotating means on a second axis transverse to said first axis, a pinion gear coaxial with said second axis and joined to said nod spindle, radar antenna support means on said spindle at right angle to said second axis, means for oscillating said nod spindle in a first direction about said second axis and to a fixed angular displacement in a second direction about said second axis, a circular cam for operating said oscillating means, said circular cam being coaxial with said means for rotating said spindle and having a helical spline on the outer periphery, means for varying the rate of oscillations in relation to spindle rotation; said varying means comprising a differential input gear joined to said cam, a differential output gear joined to said means for rotating said spindle, a differential, and a differential control motor; said oscillating means comprising an axially movable sleeve coaxial with said rotating means, a cam follower joined to said sleeve and engaging said circular cam, a spring biased for holding said cam follower in engagement with said circular cam, and a rack joined to said sleeve and engaging said pinion joined to said nod spindle; said circular cam being programmed for a variable angular rate of change per oscillation, a drive gear coaxial with said circular cam and having an internal helical spline engaging the helical spline on the outer periphery of said circular cam and having a zero rise cam on one face thereof, said drive gear rotating said circular cam and said means for rotating said spindle in one direction of rotation during which time said circular cam engages said oscillating means to produce oscillations of said nod spindle in a first direction about said second axis, and rotating said circular cam and said means for rotating said nod spindle in the opposite direction of rotation during which time the zero rise cam on said drive gear overrides said circular cam to displace said nod spindle to a fixed angle in a second direction about said second axis; and means for driving said drive gear in either a clockwise or counterclockwise direction, said driving means being a reversible electric motor.

3. A device for selectively providing scanning and tracking motion on a radar apparatus comprising: a nod spindle having radar antenna support means on said nod spindle, means for rotating said nod spindle about a first axis, said rotating means being journaled in bearings for supporting in a housing, said nod spindle being trunnioned to said rotating means on a second axis transverse to said first axis, a pinion gear coaxial with said second axis and joined to said nod spindle, a sleeve coaxial with and axially movable on said rotating means, a rack joined at one end to said sleeve and extending into engagement with said pinion gear for oscillating said nod spindle in a first direction about said second axis and to a fixed angular displacement in a second direction about said second axis, a circular cam for operating said sleeve and said rack, said circular cam being programmed to provide equal radar beam energy distribution over the entire scanned area by producing a variable rate of change in the oscillating nod spindle and being coaxially and rotatably supported on said rotating means adjacent to said sleeve and having a helical spline on the outer periphery, means for varying the rate of oscillations in relation to spindle rotation; said varying means comprising a differential input gear joined to said circular cam, a differential output gear joined to said rotating means, a differential in geared engagement with said differential input gear and said differential output gear, and a differential control motor for varying the speed of said differential output gear in relation to said differential input gear; a compression spring coaxial with said rotating means and biased to hold said sleeve in engagement with said circular cam, a drive gear having an internal helical spline coaxially engaging the helical spline on the outer periphery of said circular cam and having a circular zero rise cam on the face thereof adjacent to said sleeve, said drive gear being axially movable within limits on said circular cam when the direction of rotation of said drive gear is reversed, said drive gear rotating said circular cam and said rotating means in one direction of rotation during which time said circular cam engages said sleeve to which said rack is joined to produce oscillations of said nod spindle in a first direction about said second axis and rotating said circular cam and said rotating means in the opposite direction during which the zero rise cam on said drive gear overrides said circular cam and engages said sleeve to displace said nod spindle to a fixed angle in a second direction about said second axis; and means for driving said drive gear in either a first or a second direction.

4. A device for selectively providing scanning and tracking motion on a radar apparatus comprising: a nod spindle having radar antenna support means on said nod spindle, means for rotating said nod spindle about a first axis, said rotating means being journaled in bearings for supporting in a housing, said nod spindle being trunnioned to said rotating means on a second axis transverse to said first axis, a pinion gear coaxial with said second axis and joined to said nod spindle, a sleeve coaxial with and axially movable on said rotating means, a rack joined at one end to said sleeve and extending into engagement with said pinion gear for oscillating said nod spindle in a first direction about said second axis and to a fixed angular displacement in a second direction about said second axis, a circular cam for operating said sleeve and said rack, said circular cam being programmed to provide equal radar beam energy distribution over the entire scanned area by producing a variable rate of change in the oscillating nod spindle and being coaxially and rotatably supported on said rotating means adjacent to said sleeve and having a helical spline on the outer periphery, means geared to and changing the rotative speed of said circular cam in relation to said rotating means, a compression spring coaxial with said rotating means and biased to hold said sleeve in engagement with said circular cam, a drive gear having an internal helical spline coaxially engaging the helical spline on the outer periphery of said circular cam and having a circular zero rise cam on the face thereof adjacent to said sleeve, said drive gear being axially movable within limits on said circular cam when the direction of rotation of said drive gear is reversed, said drive gear rotating said circular cam and said rotating means in one direction of rotation during which time said circular cam engages said sleeve to which said rack is joined to produce oscillations of said nod spindle in a first direction about said second axis and rotating said circular cam and said rotating means in the opposite direction during which the zero rise cam on said drive gear overrides said circular cam and engages said sleeve to displace said nod spindle to a fixed angle in a second direction about said second axis; and means for driving said drive gear in either a first or a second direction.

References Cited by the Examiner
UNITED STATES PATENTS

| | | | |
|---|---|---|---|
| 2,437,275 | 3/48 | Skene et al. | 74—86 X |
| 2,535,699 | 12/50 | Schnell et al. | 74—86 X |
| 2,574,376 | 11/51 | Childs et al. | 74—86 X |
| 3,060,755 | 10/62 | Brosse et al. | 74—22 |

BROUGHTON G. DURHAM, *Primary Examiner.*